US012221333B2

(12) United States Patent
Arafeh et al.

(10) Patent No.: US 12,221,333 B2
(45) Date of Patent: Feb. 11, 2025

(54) BEVERAGE DISPENSER, KIT FOR ASSEMBLING THE SAME, AND CORRESPONDING METHODS OF MANUFACTURING, ASSEMBLING AND OPERATING ASSOCIATED THERETO

(71) Applicant: 2689287 ONTARIO INC., Oakville (CA)

(72) Inventors: Tariq Arafeh, Montreal (CA); Abdulrahman Saimeh, Oakville (CA)

(73) Assignee: 2689287 ONTARIO INC., Oakville, CA (US)

( * ) Notice: Subject to any disclaimer, the term of this patent is extended or adjusted under 35 U.S.C. 154(b) by 538 days.

(21) Appl. No.: 17/602,623

(22) PCT Filed: Apr. 8, 2020

(86) PCT No.: PCT/CA2020/050461
§ 371 (c)(1),
(2) Date: Oct. 8, 2021

(87) PCT Pub. No.: WO2020/206535
PCT Pub. Date: Oct. 15, 2020

(65) Prior Publication Data

US 2022/0185647 A1 Jun. 16, 2022

Related U.S. Application Data

(60) Provisional application No. 62/831,420, filed on Apr. 9, 2019.

(51) Int. Cl.

| | |
|---|---|
| ***B67D 1/00*** | (2006.01) |
| ***B67D 1/08*** | (2006.01) |
| ***B67D 1/14*** | (2006.01) |

(52) U.S. Cl.
CPC ......... *B67D 1/0058* (2013.01); *B67D 1/0862* (2013.01); *B67D 1/0867* (2013.01); *B67D 1/0895* (2013.01); *B67D 1/1416* (2013.01)

(58) Field of Classification Search
CPC ................ B01F 23/236; B01F 23/2323; B01F 23/31242; B01F 23/31243; B67D 1/0058;
(Continued)

(56) References Cited

U.S. PATENT DOCUMENTS 3,881,636 A * 5/1975 D'Aubreby ............ G01F 11/22 141/51
4,305,382 A 12/1981 Nott
(Continued)

FOREIGN PATENT DOCUMENTS

| | | |
|---|---|---|
| CA | 1 282 023 C | 3/1991 |
| CA | 2 045 319 A | 12/1991 |
| FR | 3 012 123 A1 | 4/2015 |

OTHER PUBLICATIONS

International Search Report and Written Opinion of the International Searching Authority for International Patent Application No. PCT/CA2020/050461 mailed Jul. 7, 2020, 7 pages.

*Primary Examiner* — Charles P. Cheyney
(74) *Attorney, Agent, or Firm* — ROBIC

(57) ABSTRACT

A beverage dispenser is for dispensing a consumable beverage. A processing line having a fluid path with an input end is fluidly connectable to a source container of liquid for receiving liquid from the container via a driving force, and for processing the liquid into the consumable beverage to be dispensed. A Venturi injector is provided along a fluid segment of the fluid path of the processing line, the Venturi injector being configured for selectively and adjustably injecting gas bubbles into the consumable beverage to alter at least one resulting parameter of the consumable beverage to be dispensed. The beverage dispenser also includes a tap
(Continued)

fluidly connectable to an output end of the fluid path of the processing line for receiving the consumable beverage with at least one resulting parameter having been altered, and for selectively dispensing the consumable beverage via an activation of the tap.

18 Claims, 3 Drawing Sheets

(58) Field of Classification Search
CPC .. B67D 1/0862; B67D 1/0867; B67D 1/0895; B67D 1/1416; A23L 2/54
USPC ........................... 222/190, 129.1, 146.6, 399
See application file for complete search history.

(56) References Cited

U.S. PATENT DOCUMENTS

| | | | | |
|---|---|---|---|---|
| 4,742,942 | A * | 5/1988 | Dokos | B67D 1/1416 137/600 |
| 4,852,473 | A | 8/1989 | Azpitarte | |
| 5,207,148 | A | 5/1993 | Anderson et al. | |
| 5,228,312 | A * | 7/1993 | Williams | B67D 1/0862 62/390 |
| 5,335,588 | A | 8/1994 | Mahlich | |
| 5,473,972 | A | 12/1995 | Rizzuto et al. | |
| 5,509,349 | A | 4/1996 | Anderson et al. | |
| 5,842,600 | A * | 12/1998 | Singleterry | B01F 23/2363 261/DIG. 7 |
| 6,183,800 | B1 | 2/2001 | Van Straten et al. | |
| 6,443,335 | B1 * | 9/2002 | Pinedjian | B67D 1/0861 141/2 |
| 7,021,206 | B2 | 4/2006 | Eckenhausen et al. | |
| 7,252,034 | B1 | 8/2007 | Eckenhausen et al. | |
| 7,507,430 | B2 | 3/2009 | Stearns et al. | |
| 8,383,181 | B2 | 2/2013 | Daburger et al. | |
| 8,661,966 | B2 | 3/2014 | Stearns et al. | |
| 8,962,053 | B2 | 2/2015 | Carbonini | |
| 9,623,383 | B1 | 4/2017 | Kleinrichert | |
| 9,955,710 | B2 * | 5/2018 | Hyde | B01F 23/236 |
| 10,477,883 | B2 * | 11/2019 | Giardino | B01F 23/2323 |
| 10,730,023 | B2 * | 8/2020 | Hyde | B01F 35/2217 |
| 11,192,073 | B2 * | 12/2021 | Hofius | B67D 1/006 |
| 11,661,330 | B2 * | 5/2023 | Vandekerckhove | B67D 1/0009 99/279 |
| 2011/0005400 | A1 | 1/2011 | Tien et al. | |
| 2016/0175783 | A1 * | 6/2016 | Jarrousse | B01F 23/2362 261/130 |
| 2016/0175785 | A1 * | 6/2016 | Li | B01F 25/312 99/323.1 |
| 2018/0236417 | A1 * | 8/2018 | Wilburn Borders | B01F 25/105 |
| 2020/0017349 | A1 * | 1/2020 | Bissen | F28F 13/12 |
| 2021/0094004 | A1 * | 4/2021 | Humphrey | B01F 35/7172 |

* cited by examiner

BEVERAGE DISPENSER, KIT FOR ASSEMBLING THE SAME, AND CORRESPONDING METHODS OF MANUFACTURING, ASSEMBLING AND OPERATING ASSOCIATED THERETO

CROSS-REFERENCE TO RELATED APPLICATIONS

This application is a National Stage Application of PCT/CA2020/050461, filed 8 Apr. 2020, which claims benefit of U.S. Provisional Patent Application Ser. No. 62/831,420, filed 9 Apr. 2019, and which applications are incorporated herein by reference. To the extent appropriate, a claim of priority is made to each of the above-disclosed applications.

FIELD OF THE INVENTION

The present invention relates to the field of fluid dispensers. More particularly, the present invention relates to a beverage dispenser, and also relates to a kit with corresponding components for assembling the same, and to corresponding methods of manufacturing, assembling and/or operating associated thereto.

BACKGROUND

Dispensers used for dispensing various types of beverages, such as nitro-coffee (i.e. coffee infused with nitrogen) and the like, are well known in the art.

For example, known is the "kegerator", a traditional way that has been around for many years. A "kegerator" is, in essence, a big fridge where a keg is inserted so that it and its content may be cooled, the keg being a vessel containing a liquid (or "beverage") to be dispensed, with the system being pressurized with a gas (ex. 100% or 99% (approximately) nitrogen) so that there is little or no oxidization. As previously mentioned, the keg is placed inside a big fridge, and the benefit of having a fridge is that it keeps everything cold for a longer shelf-life, and also enables to dispense a cold beverage, etc. When one pulls the tap, what happens is that, there is a pressure differential, and this activates the nitrogen gas, which wants to escape, and on its way to escaping, it goes inside the keg and pushes the liquid out, and one gets a cold product, and in particular, a Guinness™ kind of effect, because it contains 99% (approximately) nitrogen. Also known in the art are the various disadvantages and drawbacks associated with this type of conventional system: a) they are big, and they are clunky; b) one necessarily has to use a rigid container, such as a keg or a pressurized container/vessel (ex. which is essentially a keg of the Food&Beverage (F&B) industry) which is cumbersome and costly; c) one has to use nitrogen gas which is also cumbersome and costly; d) it is difficult to change nitrogen gas, in that, people that operate coffee businesses and/or are roasters and who want to provide this type of service to the customers, have a great difficulty because not only are they providing cold brewed coffee in a keg, but also, they have also to provide the nitrogen gas, and every time one switches to nitrogen gas, one has to "recalibrate" the regulator, which is also cumbersome, and time-consuming, etc.; d) it is a hassle, it is clunky, it is messy, it is costly, in that, namely, nitrogen finishes quickly and it requires a lot of space, which is undesirable for obvious reasons (ex. in big cities, like New York, for example, people are not going to want to use prime real estate space just to put a kegerator in their establishment, etc.).

Also known in the art is the "counter-top" dispenser. The way the "counter-top" works, is that it addresses the major disadvantages of the kegerator by eliminating the keg and eliminating the need for nitrogen (and corresponding nitrogen tank), and replacing the keg with something that is a non-pressurized container, such as a "bag-in-box", for example, because a "bag-in-box" provides long shelf-life in ambient temperature. Given the elimination of the keg and corresponding nitrogen tank, "air" is now used to drive the system. The downside with air is that, people can argue that it is not 99% "pure". When one typically uses "ambient air", for example, one uses air that is about 78-79% nitrogen, and the rest is oxygen (about 22-21%) and negligible $CO_2$ (ex. about 0.01%). Air filters can also be used with "counter-top" dispensers.

The way this type of machine works right now is that "instant cooling" is used instead of a massive fridge. "Instant cooling" is usually carried out using a powder aluminum cylinder, the powder aluminum cylinder being chilled so that the tubing and liquid circulating through said tubing is chilled along the path (typically, along a coiled fluid circuit of about 6 meters in length) contained in the powder aluminum cylinder, and on the way out.

One major inconvenience with this type of conventional counter-top systems is that the beverage does not come out very cold, and if it is not very cold, nitrogen dissipates faster (i.e. it will not last as long in the beverage to be consumed by the end-user, etc.). Also for this type of conventional system, one has to use an air compressor, and the way it works is that when one pulls the tap, it triggers a pressure sensor that is inside the line. Because the pressure sensor is typically connected by electricity to a start capacitor, when one pulls the tap, the pressure sensor feels a movement of air inside the line, so a signal is sent to the start capacitor which in turns, is connected to an air pump (ex. the air compressor), which switches on. As is known, the air compressor carries out essentially two functions: a) the first thing is that it powers the liquid pump, which is operated by air, and the liquid pump will draw-in the cold brew (i.e. the liquid, etc.), from a reservoir, being non-pressurized; and b) the second thing the compressor does, is when the air goes to the liquid pump, a small portion of air is deviated using a T-like component, and the air being taken away as such, is wrapped around the machine, filtered in a medical grade filter, and ultimately comes to the front of the machine, namely the tap, and so the coffee is being pulled to the tap, and simultaneously with the air having been deviated being brought to the tap as well, so that coffee and air are brought together at the tap, and go through an aerator. The aerator basically blends the coffee and the air together to give a "cascade" effect, so it takes the air and crushes it into small bubbles (ex. "micro bubbles"), so as to get the cascade effect, etc.

Also known in the art are the various disadvantages and drawbacks associated with this type of conventional system: a) it is inconsistent, because one cannot control the air that will go to the air compressor; b) the system drives or pushes a lot of air, so one gets inconsistencies, in that, many times, there will be a burst of air or sputter, and that destroys the aesthetic of the resulting drink; c) one also has to initially purge the system for every dispensing of beverage because, due to the fact that the system is air-driven/operated, there is a lot of air in the line, so before one pours a beverage (ex. coffee, cold brew, etc.), one has to pull the tap and one has to purge it a little bit, and such a purge means that one is expunging the air from the line(s) and that there is considerable waste that can add up to 1, 2, 3, 5, 10% of your cup, etc.; d) the powder aluminum cylinder does not cool sufficiently to keep the nitrogen cascade long; e) the sequence of events (i.e. pulling the tap, which activates the pressure sensor, which activates the start capacitor, which activates the air compressor, which activates the liquid pump to draw the beverage from a non-pressurized container) can be unreliable due to the many steps involved leaving room for one part of the system to fail, etc.

Known to the Applicant is U.S. Pat. No. 5,509,349 granted on Apr. 23, 1996, to ANDERSON et al., and relating to a "beverage valve venturi apparatus". This document describes a fully automated cappuccino, latte, and espresso brewing machine which includes a refrigerated milk supply from which milk is drawn by a steam driven venturi apparatus. The venturi subcombination includes independently electrically operated valving for the driving steam, for drawing milk from its supply, and for drawing air, as desired, for foaming the milk in a vortex mixer coupled to the output of the venturi. The valving may be sequential so that with each cycle of use of the apparatus, it is hygienically steam cleaned of all milk residue.

Also known to the Applicant is US patent application No. 2011/0005400 A1 made public on Jan. 13, 2011, in the name of TIEN et al., and relating to a "coffee making kettle using venturi". Namely, this document describes a coffee making kettle using Venturi, including a kettle body having a bottom forming a through opening and defining a first chamber and a second chamber. The opening has an upper circumference from which two opposite inclined surfaces extend upward. Top edges of the inclined surfaces form a circular opening. The first chamber is located above the second chamber and is greater in volume than the second chamber. The second chamber is in communication with the through opening. When a paper filter that contains an object-to-be-brewed (such as coffee powders) is positioned in the kettle body and liquid (such as hot water) is added, the liquid is filtered by the paper filter and is guided by the inclined surfaces into the second chamber, so that the brewing liquid is subjected to the effect of Venturi to induce a pressure difference and increase of flowing speed.

Also known to the Applicant are the following US patents that relate to beverage and/or coffee dispensers employing some type of Venturi principle: U.S. Pat. Nos. 4,305,382; 4,852,473; 5,207,148; 5,335,20; 5,473,972; 6,183,800 B1; 7,021,206 B2; 7,252,034 B1; 7,507,430 B2; 8,383,181 B2; 8,661,966 B2; and 8,962,053 B2.

Also known to the Applicant is U.S. Pat. No. 9,623,383 B1 granted on Apr. 18, 2017, to KLEINRICHERT, and relating to a "system to prepare nitrogen infused beverage". Indeed, this document describes a system and method to prepare and dispense a $N_2$ or $N_2/CO_2$ gas infused chilled beverage is provided. The gas infused beverage is obtained by mixing a beverage concentrate with N $N_2$ or $N_2/CO_2$ gas infused water under positive pressure and dispensing the prepared beverage through a slow pour faucet. The beverage may be any non-carbonated liquid and in one embodiment the beverage is coffee. The dispensed $N_2$ or $N_2/CO_2$ gas infused chilled coffee has a unique appearance and enhanced flavor and aroma. The system may be provided as a self-contained unit.

Despite these various known dispensers and conventional systems, there is always a need to continue innovating and finding better and/or different ways of dispensing fluids or beverages, such as coffee or nitro-coffee, for example, to provide the resulting dispensed beverage with a different "feel", "look" and/or "taste".

Therefore, it would be particularly useful to be able to provide an improved beverage dispenser which would be able to overcome or at the very least minimize some of known drawbacks associated with conventional beverage dispensers, for example.

SUMMARY OF THE INVENTION

An object of the present invention is to provide a beverage dispenser which, by virtue of its design and components, would be an improvement over other related conventional beverage dispensers and/or dispensing methods known in the prior art.

In accordance with the present invention, the above object is achieved, as will be easily understood from the present description, with a beverage dispenser (also referred to herein simply as "machine" and/or "system") such as the one briefly described herein and such as the one exemplified in the accompanying drawing(s).

More particularly, according to one aspect of the present invention, an object is to provide a beverage dispenser for dispensing a consumable beverage, the beverage dispenser comprising:

- a processing line having a fluid path with an input end being fluidly connectable to a source container of liquid for receiving liquid from said container via a driving force, and for processing the liquid into the consumable beverage to be dispensed;
- a Venturi injector being provided along a fluid segment of the fluid path of the processing line, the Venturi injector being configured for selectively and adjustably injecting gas bubbles into the consumable beverage in order to alter at least one resulting parameter (ex. texture, look, taste, flavour, temperature, colour, aspect, and/or other, etc.) of the consumable beverage to be dispensed; and
- a tap being fluidly connectable to an output end of the fluid path of the processing line for receiving the consumable beverage with at least one resulting parameter having been altered, and for selectively dispensing said consumable beverage via an activation of the tap.

Indeed, and according to a possible embodiment, the present beverage dispenser is capable of chilling and introducing a gas, such as nitrogen, for example, into a beverage (ex. cold brew coffee) to make it look and feel like a Guinness™ beer. The nitrogen adds a velvety and creamy feel, and it enhances the taste of the cold brew coffee.

According to yet another aspect of the invention, there is also provided a method of manufacturing components of the above-mentioned beverage dispenser.

According to yet another aspect of the invention, there is also provided a method of assembling components of the above-mentioned beverage dispenser.

According to yet another aspect of the invention, there is also provided a method of using the above-mentioned beverage dispenser and/or component(s) thereof.

According to yet another aspect of the invention, there is also provided a kit with components for assembling the above-mentioned beverage dispenser.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of dispensing a beverage (ex.

nitro-coffee, cold brew coffee, etc.) with the above-mentioned beverage dispenser, component(s) thereof, kit, set and/or method(s).

According to yet another aspect of the present invention, there is also provided a method of doing business with the above-mentioned beverage dispenser, beverage, component(s) thereof, kit, set and/or method(s).

The objects, advantages, and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
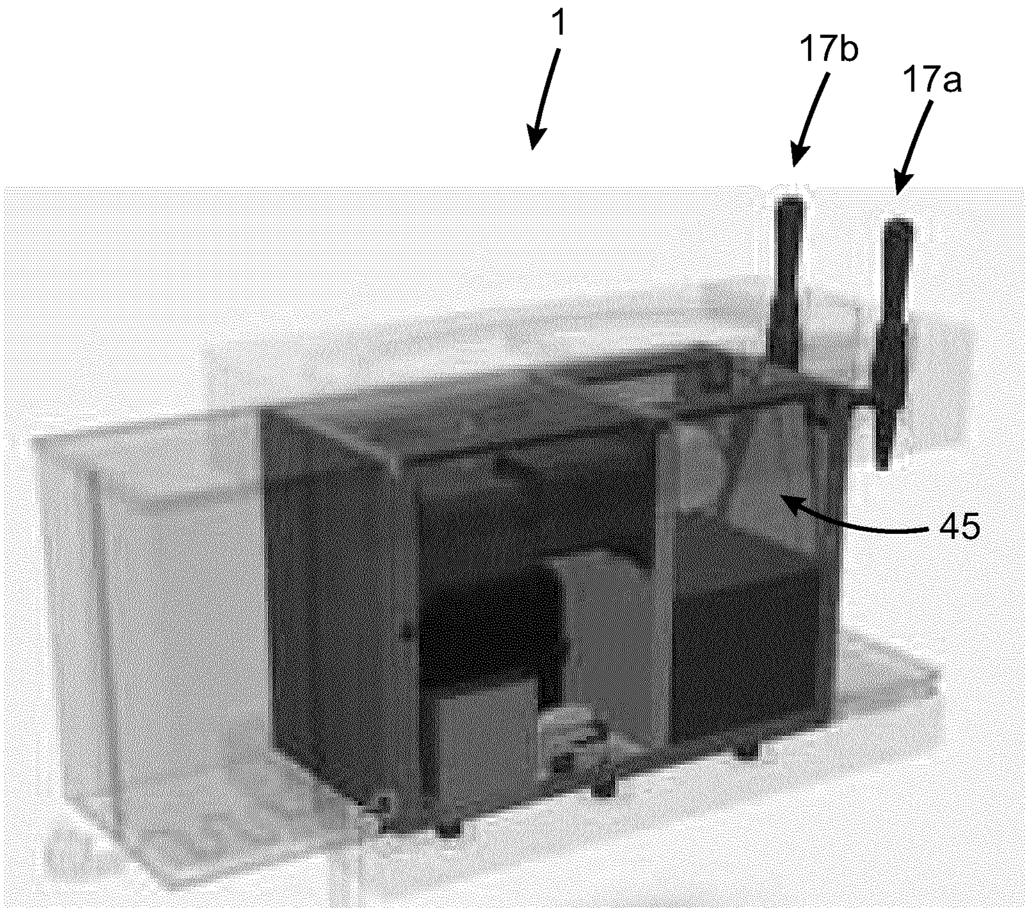
FIG. 1 is a top perspective view of a beverage dispenser according to a possible embodiment of the present invention.
Figure 2:
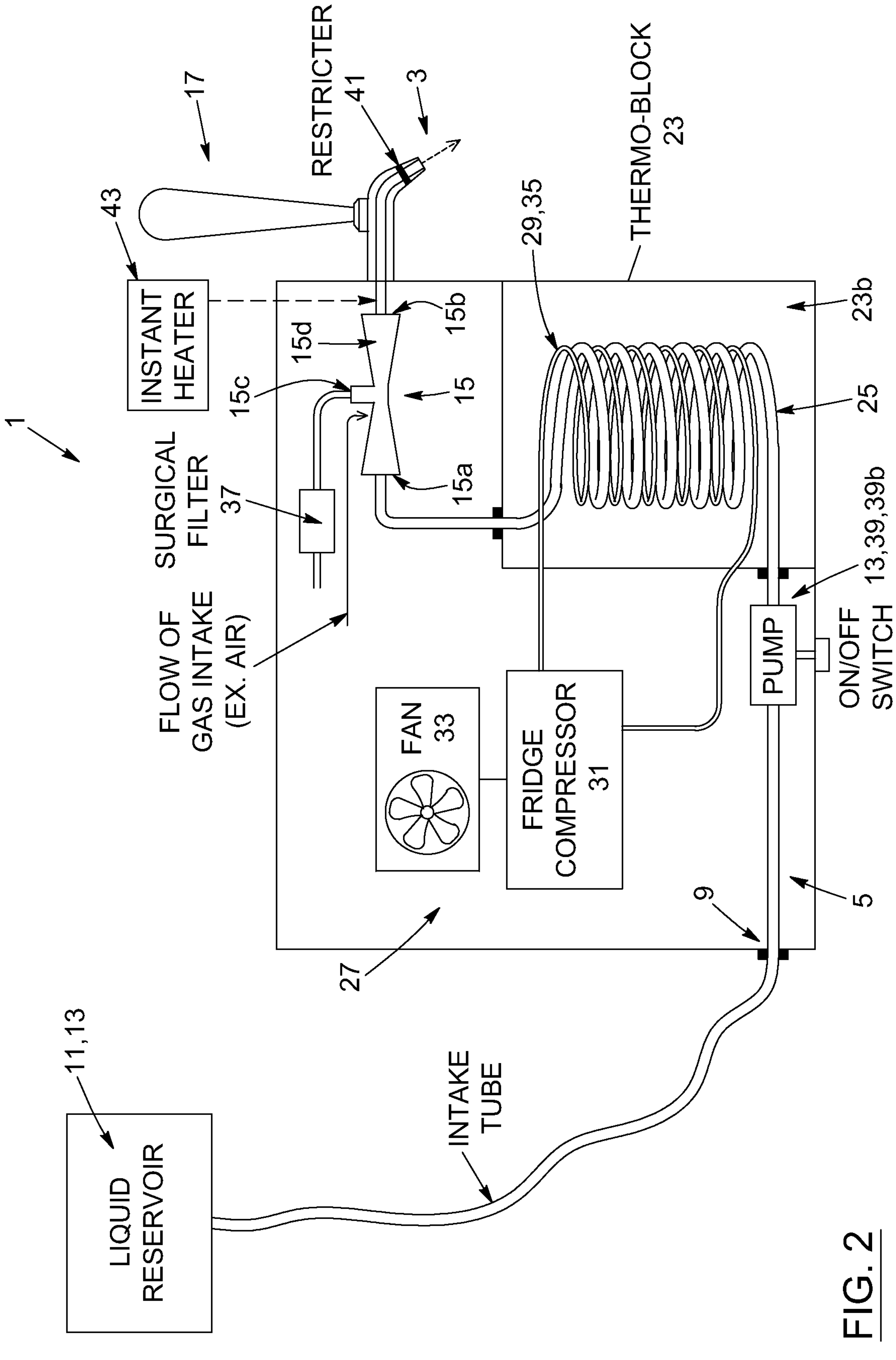
FIG. 2 is a schematic representation of a beverage dispenser according to another possible embodiment of the present invention.
Figure 3:
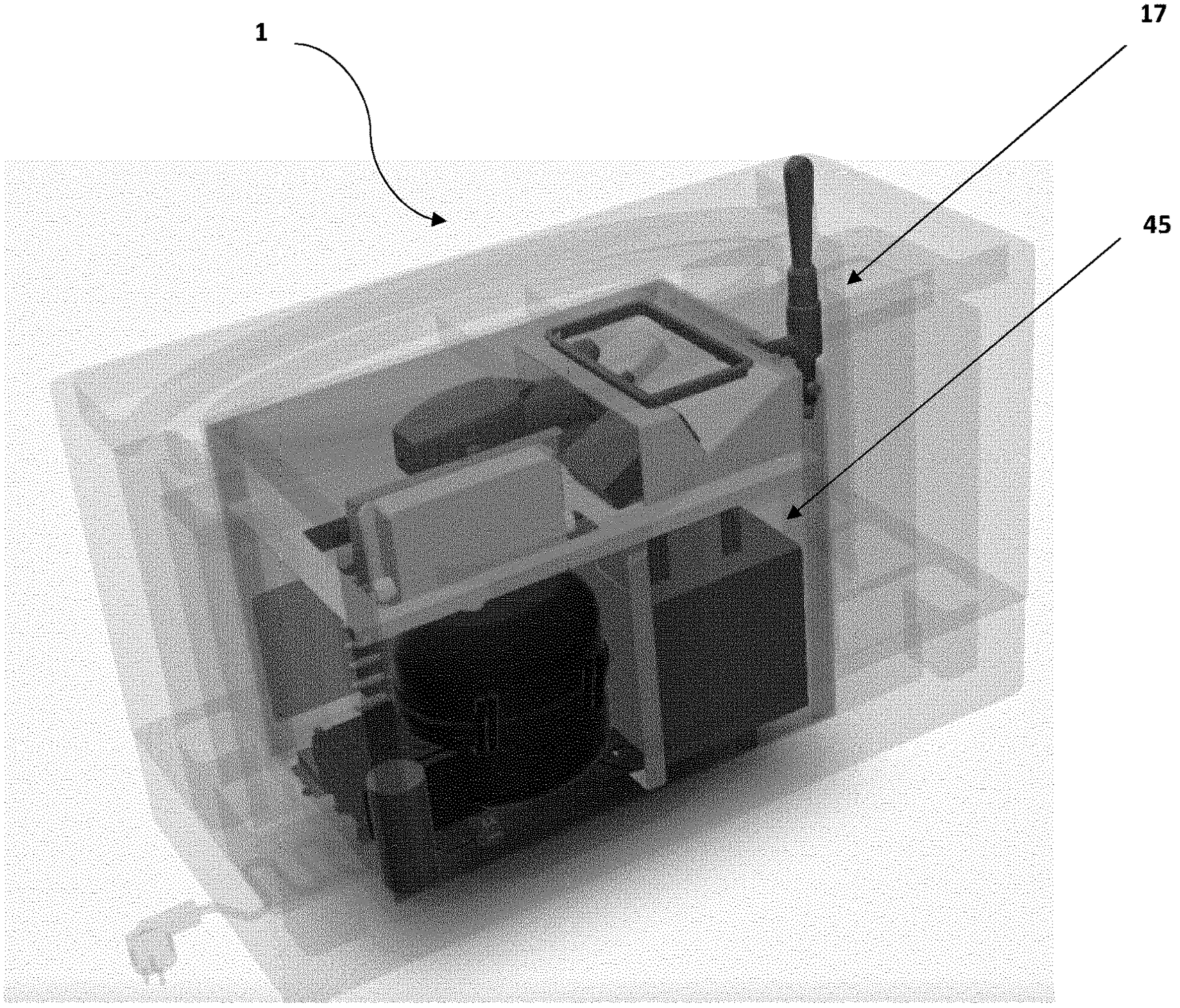
FIG. 3 is a top perspective view of a beverage dispenser according to yet another possible embodiment of the present invention.

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for use with liquids and/or beverages, such as coffee, nitro-coffee, cold brew coffee and the like, for example, it may be used with other objects and/or in other types of applications, as apparent to a person skilled in the art. For this reason, expressions such as "liquid", "beverage", "dispenser", "coffee", "nitro", "cold brew", etc., used herein should not be taken so as to limit the scope of the present invention and include all other kinds of objects and/or applications with which the present invention could be used and may be useful. For example, the present beverage dispenser could also be used with and/or for various other "edible" and/or "drinkable" products (ex. "tea", "alcohol", etc.) for instance, as well as various "non-edible" products, as can be easily understood by a person skilled in the art.

Moreover, in the context of the present invention, the expressions "beverage dispenser", "dispenser", "assembly", "machine", "system", "device", "apparatus", "product", "unit", "equipment", "tool", "method" and "kit", as well as any other equivalent expression(s) and/or compound word(s) thereof known in the art will be used interchangeably, as apparent to a person skilled in the art. This applies also for any other mutually equivalent expressions, such as, for example: a) "dispensing", "distributing", "pouring", "brewing", "dosing", etc.; b) "liquid", "fluid", "beverage", "drink", "coffee", "tea", "brew", "alcohol", "cocktail", "martini", "sparking/carbonated water", etc.; c) "container", "source", "vessel", "keg", "bag", "bag-in-box", etc.; d) "line", "path", "tubing", "piping", "connector", "link"; etc.; e) "tap", "valve", "faucet", "spout", "output", "outlet", etc.; e) "restriction plate", "aerator", "mixer", etc.; f) "hole", "orifice" "through-hole", etc.; g) "injection", "infusion", "introduction", "infiltration", "percolation", etc.; h) "gas", "air", "nitrogen", "oxygen", "bubbles", etc.; i) "cold", "cool", "chilled", etc.; j) "hot", "warm", "heated", etc.; k) "heat-exchanger", "thermal-block", etc.; l) "case", "body", "core", etc.; as well as for any other mutually equivalent expressions, pertaining to the aforementioned expressions and/or to any other structural and/or functional aspects of the present invention, as also apparent to a person skilled in the art. Also, in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects will have an implicit "longitudinal axis" or "centerline", such as the longitudinal axis of shaft for example, or the centerline of a coiled spring, for example, and that expressions such as "connected" and "connectable", or "mounted" and "mountable", may be interchangeable, in that the present invention also relates to a kit with corresponding components for assembling a resulting fully-assembled and fully-operational beverage dispenser.

Moreover, components of the present system(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the preferred embodiments of the present invention as illustrated in the accompanying drawings comprise various components, and although the preferred embodiments of the present beverage dispenser and corresponding portion(s)/part(s)/component(s) as shown consist of certain geometrical configurations, as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperation thereinbetween, as well as other suitable geometrical configurations may be used for the present beverage dispenser and corresponding portion(s)/part(s)/component(s) according to the present invention, as will be briefly explained herein and as can be easily inferred herefrom by a person skilled in the art, without departing from the scope of the present invention.

LIST OF NUMERICAL REFERENCES FOR SOME OF THE CORRESPONDING POSSIBLE COMPONENTS ILLUSTRATED IN THE ACCOMPANYING DRAWINGS

1. beverage dispenser
3. consumable beverage
5. processing line
7. fluid path (ex. tubing(s))
9. input end (of processing line)
11. source of liquid (ex. container)
13. driving force (ex. gravity, pump)
15. Venturi injector (ex. Mazzei injector)

15*a*. inlet (of Venturi injector)
15*b*. outlet (of Venturi injector)
15*c*. gas intake (ex. intake of air)
15*d*. regulator
17. tap (and/or valve)
17*a*. "cold" tap (and/or "cold" valve)
17*b*. "hot" tap (and/or "hot" valve)
19. output end (of the fluid path)
21. heat-exchanging assembly
23. thermal-block (or "thermo-block")
23*b*. body (of thermal-block)
25. circuit (of thermal-block)
27. refrigerating assembly
29. refrigerating circuit
31. fridge compressor
33. fan
35. refrigerating liquid (ex. coolant of refrigerating assembly)
37. filter (for gas intake, such as an air filter, for example)
39. electric pump
39*a*. on/off switch (of electric pump)
39*b*. built-in sensor (of electric pump)
41. restriction plate (ex. aerator)
43. instant heater
45. by-pass assembly (including by-pass line(s))

Broadly described, and as better exemplified in the accompanying drawings, the present invention relates to a beverage dispenser capable of chilling and introducing a gas, such as nitrogen, for example, into a beverage (ex. cold brew coffee) to make it look and feel like a Guinness™. The nitrogen adds a velvety and creamy feel, and it enhances the taste of the cold brew coffee, something that is not possible with other conventional devices.

The present beverage dispenser (1) may come in the form of a beverage dispenser (1) including one and/or several of the following possible components and features (and/or different possible combination(s) and/or permutation(s) thereof).

For example, and according to a possible embodiment, there is provided a beverage dispenser for dispensing a consumable beverage. The beverage dispenser may comprises a processing line having a fluid path with an input end being fluidly connectable to a source container of liquid for receiving liquid from said container via a driving force, and for processing the liquid into the consumable beverage to be dispensed. The beverage dispenser may also comprises a Venturi injector being provided along a fluid segment of the fluid path of the processing line, the Venturi injector being configured for selectively and adjustably injecting gas bubbles into the consumable beverage in order to alter at least one resulting parameter (ex. texture, look, taste, flavour, temperature, colour, aspect, and/or other, etc.) of the consumable beverage to be dispensed. The beverage dispenser may also comprises a tap (and/or valve) being fluidly connectable to an output end of the fluid path of the processing line for receiving the consumable beverage with at least one resulting parameter having been altered, and for selectively dispensing said consumable beverage via an activation of the tap (and/or valve).

The source container may include a rigid container (ex. a vessel, a reservoir, a keg, etc.), and according to a possible embodiment, the source container includes a metallic vessel (ex. made of stainless steel, and/or any other suitable material).

Alternatively, the source container may include a malleable container (ex. a bag, and/or a bag-in-a-box (BIB)).

It is to be understood that the source container can be selected from the group consisting of a pressurized container and a non-pressurized container.

According to one possible embodiment, the source container is selectively insertable into a corresponding fridge (of the beverage dispenser, and/or separate therefrom) for cooling the liquid present in the container.

The fluid path of the processing line may include tubing operatively extending between the container for providing the source of liquid and the tap of the beverage dispenser for dispensing the consumable beverage. The tubing may include tubing selected from the group consisting of plastic tubing and metallic tubing (and/or any other suitable material). According to a possible embodiment, the fluid path of the processing line includes stainless steel tubing.

As can be easily also from the accompanying figures, the beverage dispenser may comprise a heat-exchanging assembly operatively connectable to the processing line for exchanging heat with liquid flowing through the fluid path of said processing line. The heat-exchanging assembly may include a thermal-block being operatively provided along the fluid path of the processing line between at least one pump and the Venturi injector of the beverage dispenser. The thermal-block may include a fluid circuit operatively provided along a given length of the fluid path of the processing line for allowing a heat exchange with liquid flowing through said fluid circuit of the thermal-block. According to a particular embodiment, the fluid circuit of the thermal-block extends along at least 11 meters (approximately).

The fluid circuit of the thermal-block may have a cross-sectional profile selected from the group consisting of a substantially circular cross-sectional profile, a substantially square cross-sectional profile, a substantially rectangular cross-sectional profile, and/or any other suitable cross-sectional profile. According to a particular embodiment, the fluid circuit of the thermal-block has a diameter of about 6 mm, about 8 mm or about 10 mm (approximately).

As can also be easily understood from the accompany drawings, the beverage dispenser may comprise a refrigerating assembly (ex. integrated to the beverage dispenser, and/or separate therefrom) having a refrigerating circuit operatively connected (ex. thermally connected) to the fluid circuit of the thermal-block (ex. via the thermal-block) for refrigerating liquid flowing through said fluid circuit of the thermal-block. The refrigerating assembly may include a fridge compressor and a corresponding fan for driving a corresponding refrigeration liquid (ex. coolant, and/or refrigerant) along the refrigerating circuit of the refrigerating assembly. The refrigerating assembly may be used for selectively cooling liquid flowing through the fluid circuit of the thermal-block in order to dispense a cooled consumable beverage via the tap of the beverage dispenser.

According to a particular embodiment, thermal-block is made of aluminum, and optionally, the thermal-block can be an aluminum encased thermal-block (ex. liquid aluminum having been poured and hardened so as to form the main body or case of the thermal-block).

As can also be easily understood from the accompany drawings, the heat-exchanging assembly of the beverage dispenser may include a thermal electric cooling assembly. According to a particular embodiment of the present system, the heat-exchanging assembly of the beverage dispenser is configured for cooling the consumable beverage to be dispensed by the tap by a temperature drop of about 20° Celsius (approximately) from the input end to the output end of the fluid path of the processing line. According to another possible embodiment, the heat-exchanging assembly of the beverage dispenser is configured for cooling the consumable beverage to be dispensed by the tap selectively down to an output temperature of up to about 1.5° Celsius.

As can also be easily understood from the accompany drawings, the driving force for driving the liquid and corresponding consumable beverage through the fluid path of the processing line is provided by gravity (ex. the container and/or source of liquid being provided at a higher elevation than the output end of the tap, etc.). Alternatively, the driving force may be provided by a pump. Optionally also, the driving force can be provided by both gravity and a pump. According to a possible embodiment, the pump can be an electric pump (ex. an electric beverage pump).

According to another possible embodiment of the present system, the beverage dispenser is configured so as provide a pressure differential of about 20-25% (approximately) between an inlet and an outlet of the Venturi injector. Preferably, the Venturi injector is operatively connectable to the fluid path of the processing line, prior to the tap of the beverage dispenser, and includes a gas intake for receiving gas to be injected into the liquid flowing through the Venturi injector in order to alter the at least one resulting parameter of the consumable beverage to be dispensed by the tap. The gas intake of the Venturi injector may be connected to an ambient gas. Alternatively, the gas intake of the Venturi injector may be connected to a pressurized source of gas. Indeed, the present system enables for gas bubbles to be injected into the consumable beverage via the Venturi injector, and the gas bubbles may be made up of a gas selected from the group consisting of nitrogen, oxygen carbon dioxide, helium, air, and/or different possible combination(s) thereof, and/or other(s), etc. Such gas bubbles injected into the consumable beverage via the Venturi injector are preferably gas bubbles selected from the group consisting of small gas bubbles and micro gas bubbles.

According to a possible embodiment, the gas intake of the Venturi injector is an intake of air, for selectively sucking in ambient air (ex. approximately 78% nitrogen, approximately 22% oxygen, and approximately 0.1% of $CO_2$) and for injecting corresponding air bubbles into the consumable beverage to be dispensed by the tap. The gas intake of the Venturi injector can be provided with a corresponding filter (ex. a surgical-grade air filter, a medical-grade air filter, etc.). Optionally also, the Venturi injector is provided with a corresponding regulator for selectively and adjustably regulating an injection rate (ex. amount, percentage, etc.) of gas bubbles being injected into the consumable beverage by the Venturi injector. It is worth mentioning that the Venturi injector according to the present system could be replaced by another suitable type of injector, depending on the particular intentions for which the beverage dispenser is intended for, and the desired end results, as can be easily understood by a person skilled in the art.

As can also be easily understood from the accompany drawings, the tap of the beverage dispenser can be configured to create an initial vacuum effect (ex. suction effect, etc.) upon an activation of the tap. According to a possible embodiment, the beverage dispenser is configured so that the initial vacuum effect triggered by the activation of the tap is detected by a built-in sensor of the electric pump of the beverage dispenser, and in turn triggers an activation of said electric pump, for drawing liquid from the source container and in turn pumping liquid and corresponding consumable beverage through the processing line, from the source container to the resulting tap, via the Venturi injector, until the tap is eventually closed again (i.e. until the fluid path is "full" again, etc.). Various types of taps can be used for and/or with the present beverage dispenser, such as a pull-down tap, for example. The tap of the beverage dispenser may include a restriction flow plate (ex. an aerator, etc.), for example, and the restriction flow plate is preferably made of a non-corrosive material (ex. Teflon™, etc.). The restriction flow plate of the tap includes a plurality of holes (ex. circular holes, and/or other types of holes, and/or different types of combination(s) thereof, etc.), and according to a particular embodiment, the restriction flow plate of the tap includes between about 8 and about 13 holes (approximately), in which the holes of the restriction flow plate may be of different sizes. For example, the holes of the restriction flow plate may have a diameter ranging between about 0.0156 inches (approximately) and about 0.0180 inches (approximately).

As can also be easily understood from the accompany drawings, the beverage dispenser can be a counter-top beverage dispenser, and according to a possible embodiment, beverage dispenser may include a "hot" tap for dispensing a hot consumable beverage, and a "cold" tap for dispensing a cold consumable beverage. The beverage dispenser may include an instant heater operatively connectable to the fluid path of the processing line, between the Venturi injector and the tap of the beverage dispenser (or alternatively, upstream of the Venturi injector), for selectively and instantly heating the consumable beverage to be dispensed upon an activation of the hot tap, prior to exiting therefrom.

As can also be easily understood from the accompany drawings, the beverage dispenser may also include a by-pass assembly and corresponding by-pass line(s) for allowing liquid pumped through the processing line to by-pass the thermal-block when the hot tap is activated, and according to a possible embodiment, the hot and cold taps are each provided with a different processing line and corresponding Venturi device.

According to a particular embodiment, the consumable beverage to be dispensed by the beverage dispenser is a nitro-beverage (ex. nitro-coffee, nitro-tea, nitro-alcohol (ex. gin, vodka, etc.), nitro-cocktail, and/or different possible combination(s) thereof such as nitro-espresso-martini, for example, and/or other(s), etc.), and wherein the beverage dispenser is capable of dispensing different types of such nitro-beverages. Optionally, the consumable beverage to be dispensed by the beverage dispenser is nitro-coffee, and the beverage dispenser is capable of dispensing different types of such nitro-coffees. In the latter case, and according to another possible embodiment of the present system, the consumable beverage can be commercialized under the trademark name selected from the group consisting of Nitrado™ (i.e. the equivalent of a "cortado"), Nitrogato™ (i.e. the equivalent of a "macchiato"), Nitrocano™ (i.e. the equivalent of an "americana"), Nitroccino™ (i.e. the equivalent of a "cappuccino"), and Nitrospresso™ (i.e. the equivalent of an "espresso") (all of these trademark expressions having been developed by the inventor(s) and/or Applicant (s) of the present case, and are therefore the sole property thereof).

According to another aspect of the present system, components of the beverage dispenser can be modular and/or interchangeable according to specific needs of users of the beverage dispenser, and a kit with corresponding components for assembling a beverage dispenser according to any one of the preceding combination(s) may also be provided. Also intended by the present disclosure is a consumable beverage having been dispensed with a beverage dispenser according to any one of the preceding combination(s).

According to another aspect of the present system, there is also provided a method of dispensing a consumable beverage, the method comprising the steps of:

a) extracting a liquid from a source of liquid, the liquid being at least one constituent of the resulting consumable beverage;

b) conveying the liquid along a processing line for processing the liquid into the consumable beverage to be dispensed, the processing line being provided with at least one Venturi injector along a fluid segment of a fluid path of the processing line, for selectively and adjustably injecting gas bubbles into the consumable beverage in order to alter at least one resulting parameter (ex. texture, look, taste, flavour, temperature, colour, aspect, and/or other, etc.) of the consumable beverage to be dispensed; and c) dispensing the consumable beverage via a tap being fluidly connectable to an output end of the fluid path of the processing line.

Step a) may includes the step of altering a given parameter (ex. temperature, etc.) of the source of liquid prior to conveying liquid into the processing line. Step b) may include the step of conveying liquid through the processing line via a corresponding pump (ex. an electric pump, etc.). Step b) may also include the step of adjusting injection (i.e. operating, etc.) parameters of the at least one Venturi injector for selectively and adjustably altering the at least one resulting parameter (ex. texture, look, taste, flavour, temperature, colour, aspect, and/or other, etc.) of the resulting consumable beverage to be dispensed. Step b) may also include the step of altering the temperature (ex. cooling, heating, etc.) of the liquid conveyed through the processing via at least one corresponding temperature-altering assembly. Step c) may include the step of dispensing the consumable beverage via a corresponding restriction plate of the tap.

Other possible aspect(s), object(s), embodiment(s), variant(s), and/or resulting advantage(s) of the present beverage dispenser (1), all being preferred and/or optional, are briefly explained hereinbelow, and can be easily understood and/or inferred from the accompanying drawings, as well.

For example, according to one possible embodiment, the present beverage dispenser has the following functions:

a) instantly cools;

b) infuses a gas (ex. atmospheric nitrogen) inside the beverage line; and c) requires minimal space compared to other systems.

According to a possible embodiment, a primary purpose is to chill and nitrogenate cold brew coffee to make it look and feel like a Guinness™. The nitrogen adds a velvety and creamy feel. It enhances the taste of the cold brew coffee. It is advantageous for the instant cooler to make it cold for taste and experience, and to retain as much atmospheric nitrogen in the drink before it dissipates.

The benefit of such a machine is that you can not only use cold brew coffee in a reservoir that is chilled, but to use a “bag-in-box” coffee (similarly to what is possible with wine) which can be at room temperature and has a long shelf life. The present machine and system will chill it, etc.

This is not possible with conventional technology that relies on a standard beer kegerator, for example. Indeed, this type of system requires plenty of space, and requires nitrogen tanks to pressurize a keg. Therefore, this type of conventional system only works with kegs.

On the other hand, the present case machine does not require space, does not require kegs, does not require external nitrogen tanks, and the product does not have to be refrigerated, which is very advantageous, for different reasons.

Indeed, a unique and innovative aspect of the present system is the infusion mechanism of atmospheric nitrogen into the beverage line without using nitrogen tanks.

As may now be better appreciated, the present beverage dispenser (1) is a considerable improvement over conventional systems in that it overcomes the many drawbacks and inconveniences associated with “kegerators” and to “counter-tops”. Indeed, contrary to “kegerators”, the present beverage dispenser (1) does not rely on kegs(s), pressurized nitrogen tank(s), and/or big and bulky fringe(s), etc. Also, contrary to “counter-tops”, the present beverage dispenser (1) does not rely on air compressor(s), pressure switch(es), and/or gas-operated pump(s), etc.

Instead, the present beverage dispenser (1) is advantageous in that it offers an innovative design with minimal components that can be modular and/or interchangeable depending on the applications(s) for which the beverage dispenser (1) is intended for, and the desired end result(s), and the present beverage dispenser (1) is also advantageous in that it enables to provide a great variety of different types of beverages with a same beverage dispenser (1), in a simple, compact, convenient and cost-effective manner.

As may now also be better appreciated, the present beverage dispenser (1) is also advantageous over other conventional devices in that it enables to have a dispensing of consumable beverage which is “inline” and “on demand”. Namely, the infusion of gas into the consumable beverage according to the present system happens “in the moment”, without any addition equipment. Thus, a considerable advantage and resulting value of the Venturi/machine combination according to the present system is that it infuses “inline” and “on demand”. Indeed, another considerable advantage and resulting value of the Venturi/machine combination according to the present system is that a user need not use a pressurized gas and can only use ambient gas, which is “inline”, “on demand”, and also, “unlimited” (due to the virtually unlimited amount of ambient gas and/or air available). Thus, another considerable advantage and resulting value of the present beverage dispenser (1) to a customer and/or user is “speed” and “low cost” (i.e. no external mixing vessels are needed, etc.).

In terms of other possible embodiments and/or uses, it is worth mentioning that another important advantage of the present beverage dispenser (1) is that it can be used to infuse $CO_2$ (ex. a $CO_2$ tank required) into water—inline and on demand. Thus, a possible end product that could be produced and/or dispensed with the present system is “sparkling/carbonated” water, for example. This means no need for a carbonator which tend to be large, expensive, cumbersome. Yet another important advantage of the present beverage dispenser (1) is that it can be used to heat a beverage and infuse a gas prior to dispensing. Specifically, if coffee is infused with ambient nitrogen, it will then have the aesthetics and characteristics of an “espresso”. This also saves considerable time and costs when making an espresso equivalent, which is also very desirable, for obvious reasons.

Furthermore, it is worth mentioning also the present beverage dispenser (1) is also advantageous over other conventional devices, such as existing countertops, for example, in that the Venturi injector is preferably designed and to infuse the smallest micro bubbles of gas. In contrast, conventional air compressors push large blocks of air that need to be crushed in an aerator, but will not get the same quality. Thus, the use of a Venturi injector according to the present system enables to gently "pull" gas into the consumable beverage, whereas an air compressor is generally used for forcefully "pushing" gas into the consumable beverage. It is also worth mentioning that the present beverage dispenser (1) is advantageous in that liquid aluminium is preferably used, which is superior to powder aluminium in cooling performance, in that, a colder temperature is necessary for longer lasting infusion.

The present beverage dispenser (1) and corresponding parts are preferably made of substantially rigid materials, such as metallic materials, hardened polymers, composite materials, polymeric materials, and/or the like, so as to ensure a proper operation thereof depending on the particular applications for which the beverage dispenser (1) is intended and the different parameters (pressures, temperatures, etc.) in cause, as apparent to a person skilled in the art.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as apparent to a person skilled in the art.

The invention claimed is:

1. A beverage dispenser for dispensing a consumable beverage, the beverage dispenser comprising:

a processing line having a fluid path with an input end being fluidly connectable to a source container of liquid for receiving liquid from said source container via a driving force, and for processing the liquid into the consumable beverage to be dispensed;

a Venturi injector being provided along a fluid segment of the fluid path of the processing line, the Venturi injector being configured for selectively and adjustably injecting gas bubbles into the consumable beverage in order to alter at least one resulting parameter of the consumable beverage to be dispensed; and a tap being fluidly connectable to an output end of the fluid path of the processing line for receiving the consumable beverage with at least one resulting parameter having been altered, and for selectively dispensing said consumable beverage via an activation of the tap;

wherein the fluid path of the processing line includes tubing operatively extending between the source container of liquid, and the tap of the beverage dispenser for dispensing the consumable beverage;

wherein the beverage dispenser comprises a heat-exchanging assembly operatively connectable to the processing line upstream of the Venturi injector for exchanging heat with liquid flowing through the fluid path of said processing line;

wherein the beverage dispenser comprises a refrigerating assembly having a refrigerating circuit operatively connected to the fluid circuit of the heat-exchanging assembly for refrigerating liquid flowing through said fluid circuit of the heat-exchanging assembly, in order to further alter the at least one resulting parameter of the consumable beverage to be dispensed by the tap;

wherein the Venturi injector is operatively connectable to the fluid path of the processing line, prior to the tap, and includes a gas intake for receiving gas to be injected into liquid flowing through the Venturi injector in order to alter the at least one resulting parameter of the consumable beverage to be dispensed by the tap;

wherein the Venturi injector is provided with a regulator for selectively and adjustably regulating an injection rate of gas into the gas intake of the Venturi injector, and a surgical filter provided upstream of the regulator for filtering the gas to be injected into liquid flowing through the Venturi injector; and wherein the Venturi injector is configured to inject gas bubbles into the consumable beverage, when refrigerated, in order to generate a texture motion of the consumable beverage when the consumable beverage is dispensed in a drinking container.

2. A beverage dispenser according to claim 1, wherein the source container includes a rigid container and/or a malleable container, the rigid container being a metallic vessel, optionally made of stainless steel, and the malleable container being selected from the group consisting of a bag and a bag-in-a-box (BIB), with the source container also being either a pressurized container or a non-pressurized container.

3. A beverage dispenser according to according to claim 2, wherein the tubing includes tubing selected from the group consisting of plastic tubing and metallic tubing; and wherein the fluid path of the processing line includes stainless steel tubing.

4. A beverage dispenser according to claim 3, wherein the heat-exchanging assembly includes a thermal-block being operatively provided along the fluid path of the processing line between at least one pump and the Venturi injector of the beverage dispenser; and wherein the thermal-block includes a fluid circuit operatively provided along a given length of the fluid path of the processing line for allowing a heat exchange with liquid flowing through said fluid circuit of the thermal-block.

5. A beverage dispenser according to claim 4, wherein the fluid circuit of the thermal-block extends along at least 11 meters approximately;

wherein the fluid circuit of the thermal-block has a cross-sectional profile selected from the group consisting of a substantially circular cross-sectional profile, a substantially square cross-sectional profile, a substantially rectangular cross-sectional profile, and/or any other suitable cross-sectional profile; and wherein the fluid circuit of the thermal-block has a diameter of about 6 mm, about 8 mm or about 10 mm approximately.

6. A beverage dispenser according to claim 1, wherein the refrigerating assembly includes a fridge compressor and a corresponding fan for driving a corresponding refrigeration liquid along the refrigerating circuit of the refrigerating assembly;

wherein the refrigerating assembly is used for selectively cooling liquid flowing through the fluid circuit of the thermal-block in order to dispense a cooled consumable beverage via the tap of the beverage dispenser;

wherein the thermal-block is made of aluminum;

wherein the thermal-block is an aluminum encased thermal-block; and wherein the heat-exchanging assembly of the beverage dispenser includes a thermal electric cooling assembly.

7. A beverage dispenser according to claim 1, wherein the heat-exchanging assembly of the beverage dispenser is configured for cooling the consumable beverage to be dispensed by the tap by a temperature drop of about 20° Celsius from the input end to the output end of the fluid path of the processing line; and wherein the heat-exchanging assembly of the beverage dispenser is configured for cooling the consumable beverage to be dispensed by the tap selectively down to an output temperature of up to about 1.5° Celsius.

8. A beverage dispenser according to claim 1, wherein the driving force for driving the liquid and corresponding consumable beverage through the fluid path of the processing line is provided by gravity and/or by a pump, the pump being an electric beverage pump.

9. A beverage dispenser according to claim 8, wherein the beverage dispenser is configured so as provide a pressure differential of about 20-25% between an inlet and an outlet of the Venturi injector.

10. A beverage dispenser according to claim 1, wherein the gas intake of the Venturi injector is connected to an ambient gas and/or to a pressurized source of gas;

wherein gas bubbles injected into the consumable beverage via the Venturi injector are gas bubbles made up of a gas selected from the group consisting of nitrogen, oxygen carbon dioxide, helium, air, and/or different possible combination(s) thereof; and wherein gas bubbles injected into the consumable beverage via the Venturi injector are gas bubbles selected from the group consisting of small gas bubbles and micro gas bubbles.

11. A beverage dispenser according to claim 10, wherein the gas intake of the Venturi injector is an intake of air, for selectively sucking in ambient air having approximately 78% nitrogen, approximately 22% oxygen, and approximately 0.1% of $CO_2$, and for injecting corresponding air bubbles into the consumable beverage to be dispensed by the tap.

12. A beverage dispenser according to claim 1, wherein the tap of the beverage dispenser is configured to create an initial vacuum effect upon an activation of the tap;

wherein the beverage dispenser is configured so that the initial vacuum effect triggered by the activation of the tap is detected by a built-in sensor of the electric pump of the beverage dispenser, and in turn triggers an activation of said electric pump, for drawing liquid from the source container and in turn pumping liquid and corresponding consumable beverage through the processing line, from the source container to the resulting tap, via the Venturi injector, until the tap is eventually closed again; and wherein the tap of the beverage dispenser is a pull-down tap.

13. A beverage dispenser according to claim 12, wherein the tap of the beverage dispenser includes a restriction flow plate;

wherein the restriction flow plate is made of a non-corrosive material; and wherein the restriction flow plate of the tap includes a plurality of holes.

14. A beverage dispenser according to claim 13, wherein the restriction flow plate of the tap includes between about 8 and about 13 holes;

wherein the holes of the restriction flow plate are of different sizes; and wherein the holes of the restriction flow plate have a diameter ranging between about 0.0156 inches and about 0.0180 inches.

15. A beverage dispenser according to claim 13, wherein the beverage dispenser is a counter-top beverage dispenser;

wherein the beverage dispenser includes a "hot" tap for dispensing a hot consumable beverage, and a "cold" tap for dispensing a cold consumable beverage;

wherein the beverage dispenser includes an instant heater operatively connectable to the fluid path of the processing line, either between the Venturi injector and the tap of the beverage dispenser, or upstream of the Venturi injector, for selectively and instantly heating the consumable beverage to be dispensed upon an activation of the hot tap, prior to exiting therefrom;

wherein the beverage dispenser includes a by-pass assembly and corresponding by-pass line(s) for allowing liquid pumped through the processing line to by-pass the thermal-block when the hot tap is activated; and wherein the hot and cold taps are each provided with a different processing line and corresponding Venturi device.

16. A beverage dispenser according to claim 15, wherein the consumable beverage to be dispensed by the beverage dispenser is a nitro-beverage selected from the group consisting of a nitro-coffee, nitro-tea, nitro-alcohol, nitro-cocktail, and/or different possible combination(s) thereof, and wherein the beverage dispenser is capable of dispensing different types of such nitro-beverages.

17. A beverage dispenser for dispensing a consumable beverage, the beverage dispenser comprising:

processing line having a fluid path with an input end being fluidly connectable to a source container of liquid for receiving liquid from said source container via a driving force, and for processing the liquid into the consumable beverage to be dispensed;

a Venturi injector being provided along a fluid segment of the fluid path of the processing line, the Venturi injector being configured for selectively and adjustably injecting gas bubbles into the consumable beverage in order to alter at least one resulting parameter of the consumable beverage to be dispensed; and a tap being fluidly connectable to an output end of the fluid path of the processing line for receiving the consumable beverage with at least one resulting parameter having been altered, and for selectively dispensing said consumable beverage via an activation of the tap;

wherein a gas intake of the Venturi injector is connected to a pressurized source of gas, the Venturi injector being provided with a regulator for selectively and adjustably regulating an injection rate of gas into the gas intake of the Venturi injector, and a surgical filter provided upstream of the regulator for filtering gas to be injected into liquid flowing through the Venturi injector;

wherein gas bubbles injected into the consumable beverage via the Venturi injector are gas bubbles made up of nitrogen;

wherein the tap includes a "hot" tap for dispensing a hot consumable beverage, and a "cold" tap for dispensing a cold consumable beverage;

wherein the beverage dispenser includes an instant heater operatively connectable to the fluid path of the processing line, either between the Venturi injector and the tap of the beverage dispenser, or upstream of the Venturi injector, for selectively and instantly heating the consumable beverage to be dispensed upon an activation of the hot tap, prior to exiting therefrom;

wherein the beverage dispenser includes a by-pass assembly and corresponding by-pass line(s) for allowing liquid pumped through the processing line to by-pass a thermal-block of the instant heater when the hot tap is activated; and wherein the Venturi injector is configured to inject gas bubbles into the consumable beverage, when refrigerated, in order to generate a texture motion of the consumable beverage when the consumable beverage is dispensed in a drinking container, the texture motion of the consumable beverage when the consumable beverage is dispensed in the drinking container comprising a downward cascading motion of a peripheral portion of the consumable beverage proximate a peripheral wall of the drinking container.

18. A beverage dispenser according to claim 17, wherein the consumable beverage to be dispensed by the beverage dispenser is a nitro-beverage selected from the group consisting of a nitro-coffee, nitro-tea, nitro-alcohol, nitro-cocktail, and/or different possible combination(s) thereof, and wherein the beverage dispenser is capable of dispensing different types of such nitro-beverages.

* * * * *